United States Patent [19]

Ratz

[11] Patent Number: 4,665,779
[45] Date of Patent: May 19, 1987

[54] METHOD FOR MAKING STRIPPING DIES

[75] Inventor: Kevin D. Ratz, Edinburgh, Ind.

[73] Assignee: S.O.S. Dies, Inc., Columbus, Ind.

[21] Appl. No.: 711,172

[22] Filed: Mar. 13, 1985

[51] Int. Cl.⁴ .............................................. B21K 5/20
[52] U.S. Cl. ................................... 76/107 R; 29/415; 29/426.5
[58] Field of Search ......................... 76/107 R, 107 C; 29/415, 418, 416, 465, 426.5

[56] References Cited

U.S. PATENT DOCUMENTS

| 2,787,922 | 4/1957 | Bein | 76/107 C |
| 3,383,969 | 5/1968 | Saunders | 76/107 C |

FOREIGN PATENT DOCUMENTS

| 165649 | 11/1953 | Australia | 76/107 C |
| 200314 | 9/1955 | Australia | 76/107 C |
| 887918 | 4/1943 | France | 76/107 R |

Primary Examiner—Roscoe V. Parker
Attorney, Agent, or Firm—Woodard, Weikart, Emhardt & Naughton

[57] ABSTRACT

Stripping dies and a method of fabricating matching male and female stripping dies wherein the female die and a portion of the male die are fabricated from the same piece of wood. A series of separated sawcuts are cut into a first sheet of wood to define the shape of a female stripping die using a saw blade of thickness approximately twice the amount by which a diecut sheet of cardboard, corrugated paperboard, corrugated plastic or the like extends beyond the edges of the female die during the stripping operation. Spacer blocks are then mounted on the first sheet of wood in a plurality of locations corresponding to portions of scrap material on the diecut sheet, and the first sheet of wood is attached to a base sheet of wood through the spacer blocks. Additional sawcuts are then made to connect the separated sawcuts, and then the male and female dies are separated.

5 Claims, 7 Drawing Figures

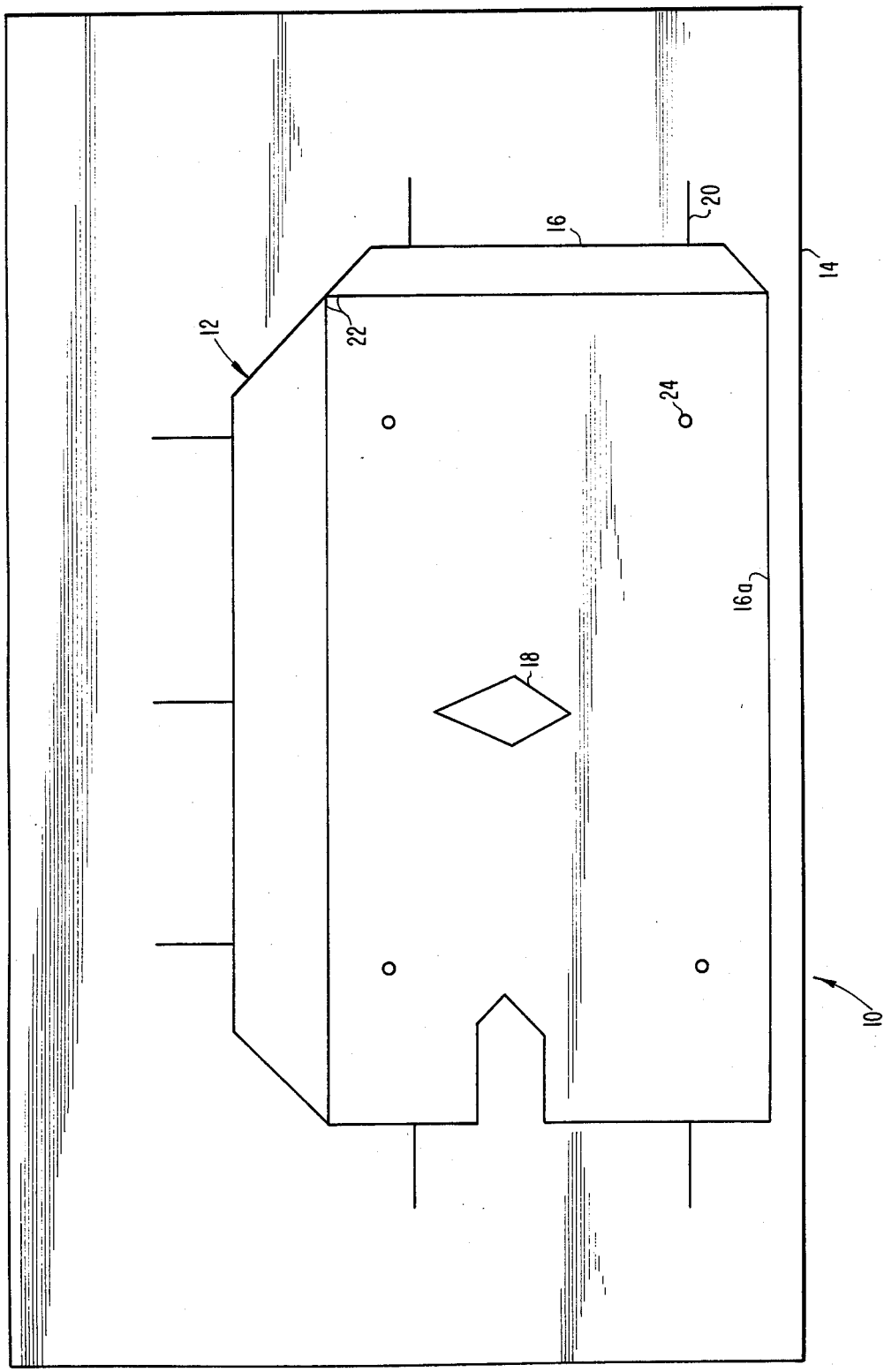

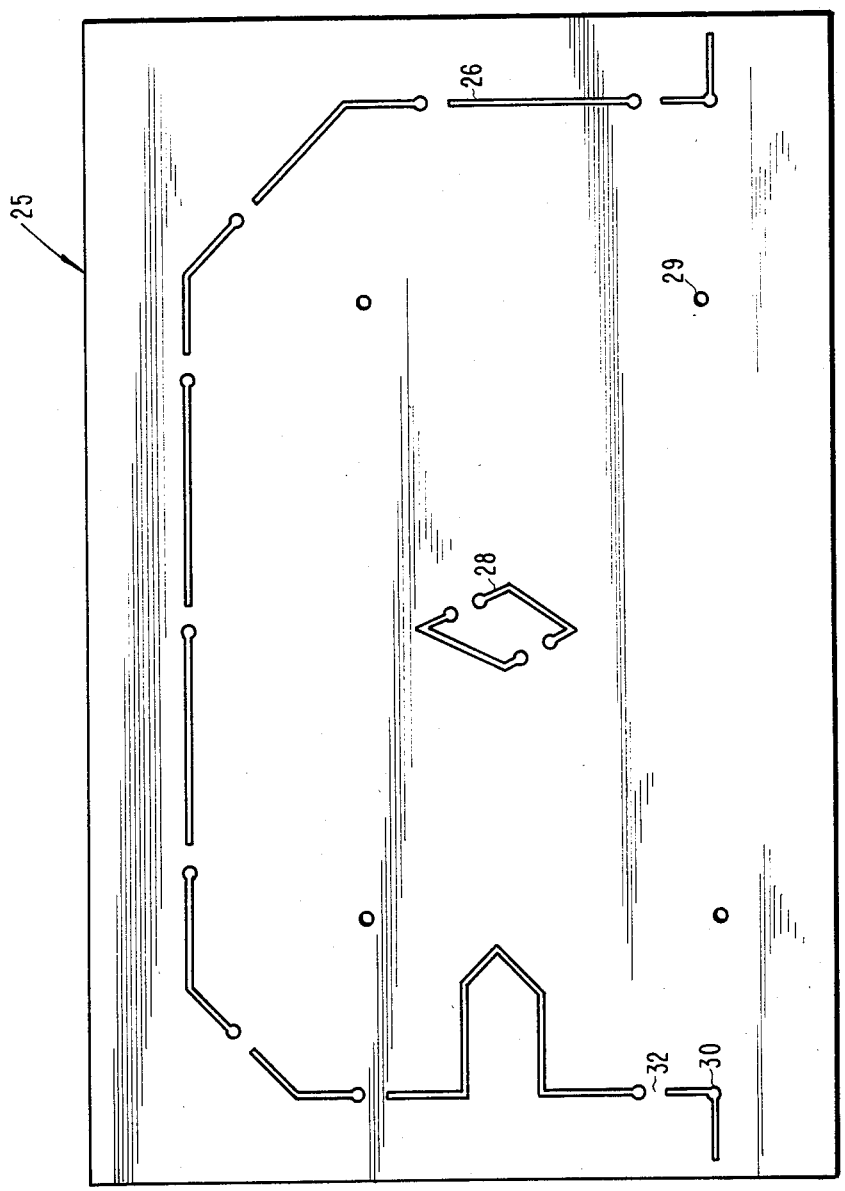

METHOD FOR MAKING STRIPPING DIES

BACKGROUND OF THE INVENTION

This invention relates to dies for use in manufacturing diecut sheets of cardboard, corrugated paperboard, corrugated plastic or the like, and more particularly to matching male and female stripping dies for use in stripping scrap material away from such diecut sheets.

Containers of many shapes and sizes are commonly manufactured in high-speed diecutting machines in which one or more cutting dies cut the outline and interior shapes of a container out of a sheet of carboard or some corrugated material. A certain amount of scrap material is necessarily formed as a byproduct of the diecutting operation, and this scrap material needs to be removed from the main product portion of the diecut sheet at some point in order for that portion to be folded into a finished container. Some diecutting machines have stripping dies or pins which remove the scrap material from the diecut sheet.

Stripping dies operate in pairs which cooperate to effect the separation of the scrap material from the diecut sheet, one die of the pair being designated female and the other die being designated male on the basis of their relative shapes. Both stripping dies are conventionally made of wood. The female die is fabricated in the same shape as the main product portion of the diecut sheet but is slightly smaller in size than that portion such that all edges of the main product extend beyond the edges of the female die. The female die may include interior through holes and, accordingly, interior edges corresponding to holes in the end product container. Typically, after the sheet has been cut by the cutting die or dies, it is transported to a position overlying the female die, and the male die is forced down over the female die and into contact with the diecut sheet. The male die is fabricated with protruding portions which are forced against the surface of portions of the scrap material to strip the scrap from the main product. The protruding portions have heretofore been fabricated in the form of stripping rails arranged on the male die such that there is a clearance between the rails and all edges of the female die when the male die is forced over the female die. After the stripping operation the main product portion of the diecut sheet is transported to a stacking device or to some other location for further operations such as folding, bundling and shipment.

Conventionally, the male and female stripping dies are made in two completely separate operations, from two separate pieces of wood. The female die is cut in the shape of the cutting die, as described above, and the leftover wood is discarded as scrap. The male die is formed from a base sheet of wood onto which the stripping rails described above are attached by hand, using the female die as a guide, the female die being maintained in a desired alignment with the base sheet by means of dowel pins placed through holes provided in the female die and the base sheet for that purpose. This technique wastes material and consequently increases the overall cost of a die set. The labor cost associated with fabricating a matching set of dies using this technique is also high due to the requirement of hand cutting and placement of a number of stripping rails. Hand placement also results in inaccuracies of placement of the stripping rails which can cause ineffective stripping or even damage to the stripping dies.

Stripping rails also close off a space between the base sheet of the male die and the diecut sheet and thereby could result in a partial vacuum buildup deleteriously affecting the machine operation when the male die is removed after the stripping operation. In the past, holes have had to be cut through the base sheet to prevent the vacuum buildup.

SUMMARY OF THE INVENTION

The present invention provides a new construction of stripping dies and a method of fabricating matching male and female stripping dies. The method comprises the steps of cutting a series of separated sawcuts defining the shape of a female stripping die in a first sheet of wood of a first predetermined thickness with a saw blade of thickness approximately twice the amount by which a diecut sheet of cardboard, corrugated paperboard, corrugated plastic or the like extends beyond the edges of the female die during the stripping operation; mounting spacer blocks on the first sheet of wood in a plurality of locations corresponding to portions of the scrap material on the diecut sheet; attaching the first sheet of wood to a base sheet of wood through the spacer blocks; cutting additional sawcuts to connect the separated sawcuts; and then separating the male and female dies.

According to another aspect of the invention, a male stripping die is provided for use in stripping scrap material away from a diecut sheet of cardboard, corrugated paperboard, corrugated plastic or the like, in which the male die comprises a base sheet of wood, a contact portion contacting substantially all of one surface of the scrap material at one time during the stripping operation, and a plurality of spacer blocks mounted between and interconnecting the contact portion and the base sheet.

According to a further aspect of the invention, a matching pair of male and female stripping dies is provided for use in stripping scrap material away from a diecut sheet of cardboard, corrugated paperboard, corrugated plastic or the like, in which the male die has a base piece, a contact portion contacting substantially all of one surface of the scrap material at one time during the stripping operation, and a plurality of spacer blocks mounted between and interconnecting the contact portion and the base sheet, and in which the female die and the contact portion of the male die are fabricated from the same piece of wood.

A general object of the invention is to provide improved stripping dies and a method of making the same.

Another object is to reduce the material waste associated with diemaking and to reduce the overall cost of a die set.

Another object is to simplify the fabrication of a matching set of dies.

Other objects and advantages of the present invention will be apparent from the following detailed description read in conjunction with the accompanying drawings.

BRIEF DESCRIPTION OF THE DRAWINGS

FIG. 1 is a top view of an exemplary cutting die such as might be used with the present invention.

FIG. 2 is a top view of a portion of the preferred embodiment of matching male and female stripping dies fabricated according to the invention.

DESCRIPTION OF THE PREFERRED EMBODIMENT

Figure 3A:
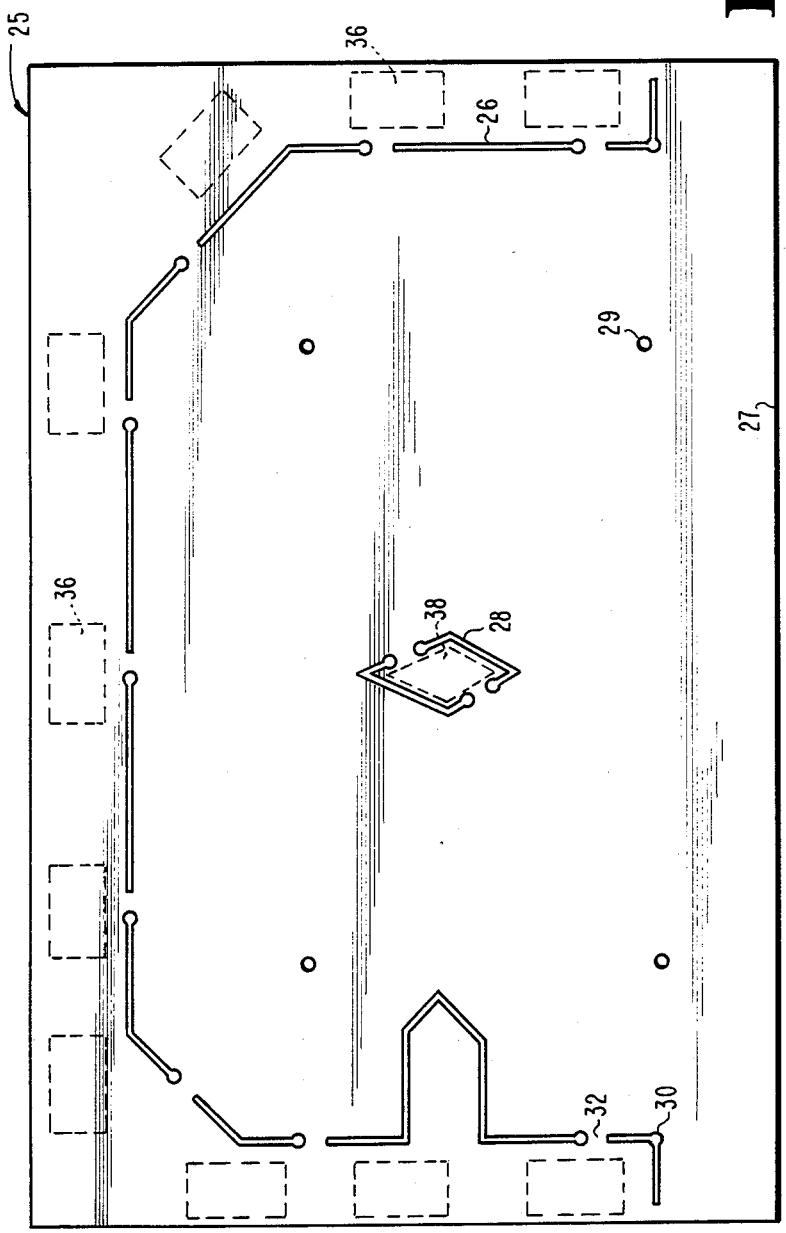
FIG. 3A is a top view of the preferred embodiment of the stripping dies according to the invention, illustrating a later stage in the fabrication process.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a top view of a cutting die 10 of the type used in conventional diecutting machines. Cutting die 10 has a rigid metal portion 12 mounted in a plywood die board 14, the metal portion 12 being made up of cutting rules or knives 16, 18 and 20 and creasing rules 22 arranged to form a pattern for the diecut product. Reference numeral 16 is intended herein to refer to the interconnected cutting rules which define the perimeter of metal portion 12, reference numeral 18 similarly refers to a rule or rules defining a hole to be cut into the diecut product, and reference numeral 20 refers to the seven rules shown extending from the perimeter of metal portion 12 toward the edge of die board 14. Creasing rules 22 provide score lines in the diecut sheet to enable folding of the diecut product. It will be understood by those skilled in the art that the cutting and creasing rules depicted in FIG. 1 extend directly outward toward the viewer, and the cutting rules extend outward from the die board slightly more than the creasing rules by an amount which depends on the type of corrugated board or other material being cut. It will be further understood that cutting rules 16 and creasing rules 22 cooperate to create two flaps on the diecut product, such as might be desired for part of a corrugated display, for example. Cutting rules 20 are provided for trim breaking, that is, cutting the scrap material into smaller sections to facilitate the removal of the scrap from the diecut sheet. Cutting die 10 further includes four alignment holes 24 which are drilled at a point in the process which will be described below.

FIG. 2 illustrates from a top view a portion of the preferred embodiment of matching male and female stripping dies, at an initial stage in the die fabrication process. The female die and a portion of the male die are fabricated from a single board 25, which board is preferably ½-inch thick plywood. A series of sawcuts 26 and 28 are cut with a jigsaw into board 25 to establish a dividing line between the portions of the board intended as the male and female dies, which portions may be identified respectively as the portions generally above and below sawcuts 26, in terms of their relative placement on the page of FIG. 2. The locations of the sawcuts are established by guide lines on the bottom of board 25 defined by the image of the cutting rules 16 and 18 on cutting die 10 (FIG. 1). The guide lines are preferably established by placing the cutting surface of the cutting die directly against the bottom of board 25, with the lead edge cutting rule 16a (FIG. 1) flush with the front edge 27 of board 25. Then alignment holes 29 and 24 (FIG. 1) are drilled, and dowel pins are placed through those holes to hold the cutting die and board 25 in alignment. Then, by tapping on the cutting die, impressions of the cutting rules are made in board 25. The cutting die is then removed from the board.

A number of passage holes 30, 3/16 inch in diameter, are drilled through the board 25 in order to permit passage of the jigsaw blade therethrough, and then the sawcuts 26 are made. First a blade approximately 1/16 thick is used to accurately follow the guide lines just described, and then a blade approximately ⅛ inch thick is used to create a sawcut approximately ⅛ inch wide. This sawcut width corresponds to and defines the clearance maintained between the male and female dies during the stripping operation. Importantly, the sawcuts 26 are made in a discontinuous pattern to separate them and thereby maintain bridges 32 between the portions corresponding to the male and female dies.

Figure 3B:
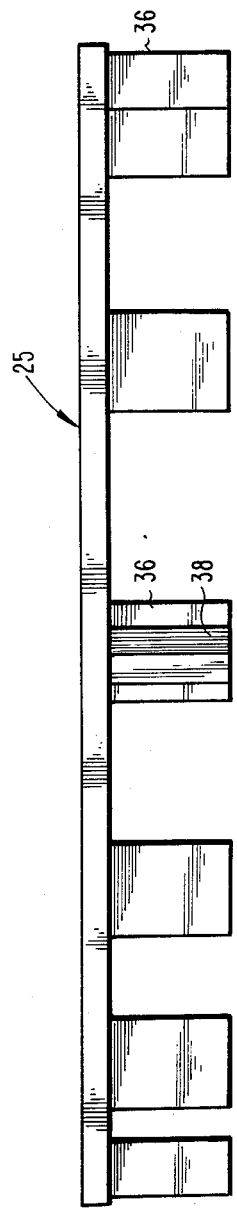
FIG. 3B is a front view of the stripping dies shown in FIG. 3A.

In the next stage of the fabrication process, illustrated in FIGS. 3A and 3B, spacer blocks 36 and 38 are mounted on the board 25 underneath the portion corresponding to the male die. These spacer blocks are ⅞ inch thick and are preferably glued in place on the board with a suitable glue, such as a conventional white glue.

Figure 4A:
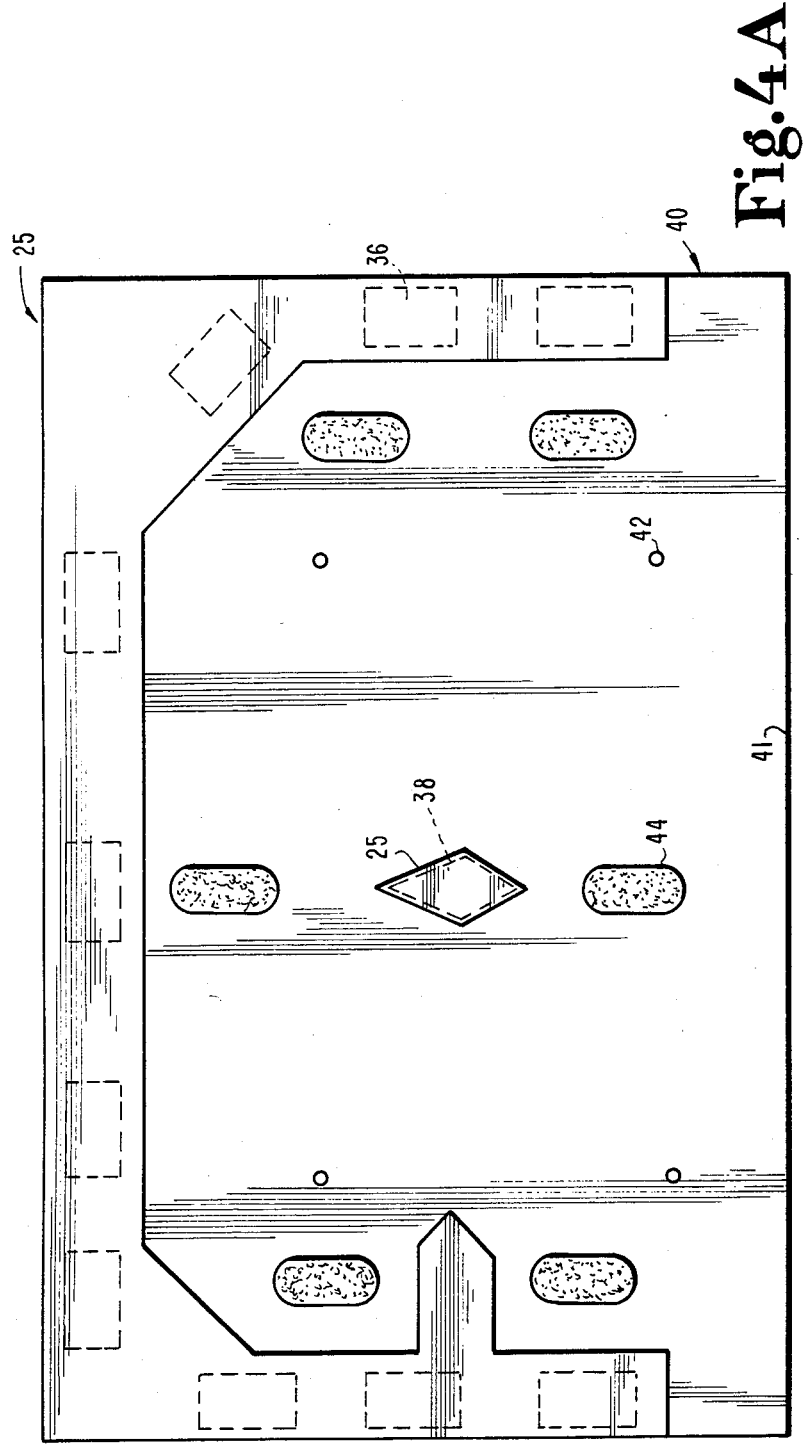
FIG. 4A is a top view of a finished male stripping die according to the invention.
Figure 4B:
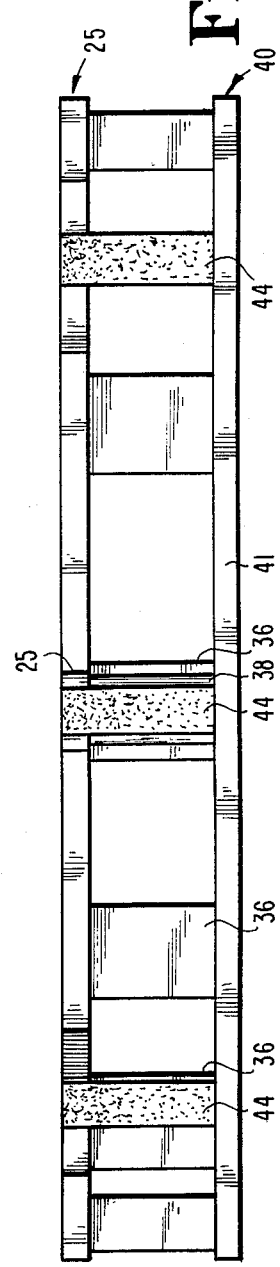
FIG. 4B is a front view of a finished male stripping die according to the invention.
Figure 5:
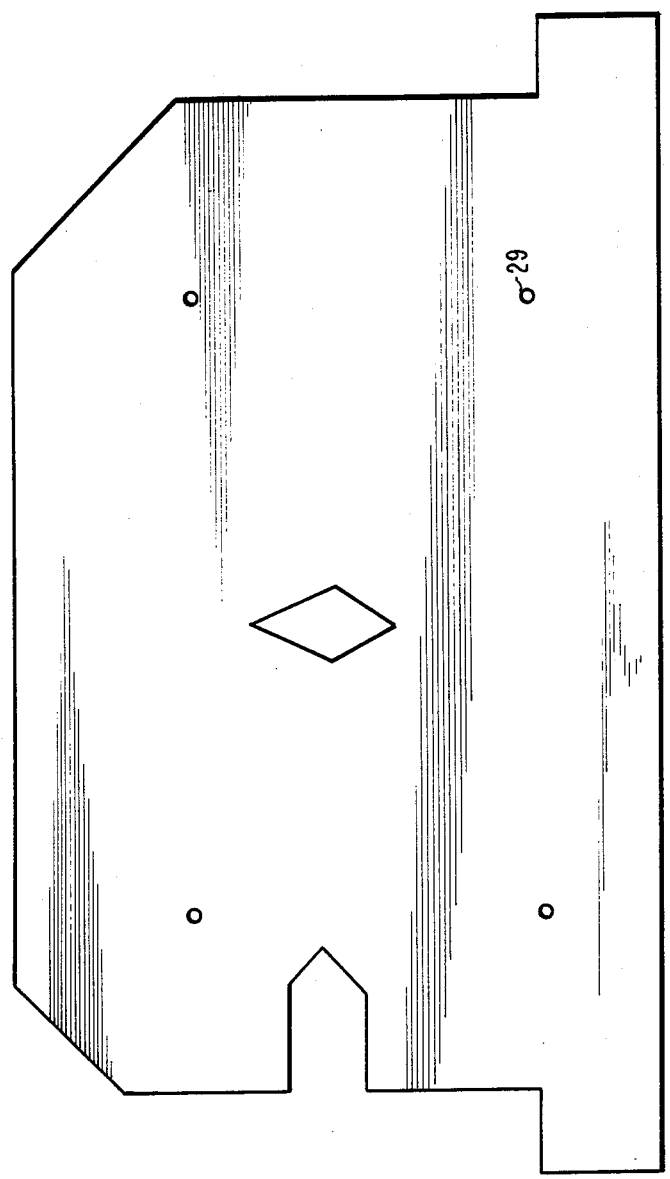
FIG. 5 is a top view of a finished female stripping die according to the invention.

Referring now to FIG. 4A, a base sheet 40 of plywood ⅝ inch thick is predrilled with alignment holes 42. Holes 42 are preferably drilled at the same time as alignment holes 24 and 29 previously described, by placing front edge 41 of sheet 40 flush with front edge 27 of board 25 and then drilling all alignment holes at the same time. After the spacer blocks are mounted on board 25, glue is applied to the bottoms of the spacers 36 and 38, and board 25 is attached to base sheet 40 through the spacers. Dowel pins are through alignment holes 29 and 42 at this time to maintain proper alignment. Then the portions of board 25 corresponding to the male die are stapled to the spacers and base sheet 40 with two-inch staples. A jigsaw is then used to remove the bridges separating the sawcuts shown in FIG. 2, at which point the fabrication of the female die is finished. As shown in FIGS. 4A and 4B, the female die is finished and removed, the finished female die being shown in FIG. 5.

The final step in the fabrication process is adding sponge rubber pieces 44 to the top of base sheet 40. The sponge rubber acts to remove any portion of the main product portion of the diecut sheet which may stick to the male die and to enhance the operating efficiency of the stripping operation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A method of fabricating matching male and female stripping dies for use in stripping scrap material away from a main product portion of a diecut sheet of cardboard, corrugated paperboard, corrugated plastic or the like, said stripping operation including applying a shear force to said diecut sheet with a male stripping die and a female stripping die placed on opposite sides of said diecut sheet in respective alignment with said scrap material and said main product portion and with said main product portion extending beyond the edges of the female die, said method comprising the steps:

(a) cutting a series of separated sawcuts defining the shape of a particular female stripping die in a first sheet of wood of a first predetermined thickness with a saw blade of thickness approximately twice the amount by which said main product portion of said diecut sheet is desired to extend beyond the edges of said particular female die during said stripping operation;

(b) mounting spacer blocks on said first sheet of wood in a plurality of locations in alignment with portions of said scrap material on said diecut sheet during said stripping operation;

(c) attaching said first sheet of wood to a base sheet of wood through said spacer blocks; and (d) cutting additional sawcuts to connect said separated sawcuts.

2. The method of claim 1 wherein said attaching step includes sliding dowel pins through holes provided in said particular female die and said base sheet of wood for this purpose, gluing said base sheet to a plurality of said spacer blocks, and then stapling said first sheet to said base sheet through said spacer blocks.

3. The method of claim 2 wherein said first cutting step is performed by cutting said first sheet of wood along a series of guide lines defined by the image of a cutting die used to create said diecut sheet.

4. The method of claim 3 further comprising the steps:

(f) drilling a saw passage hole through said first sheet at locations corresponding to one end of an interior sawcut, said drilling step being performed before said first cutting step; and (g) passing a jigsaw blade through each passage hole to permit cutting of the associated sawcut.

5. The method of claim 4 wherein one surface of said male die contacts said diecut sheet during said stripping operation, said method further comprising the step:

(h) attaching sponge rubber to said surface of said male die which contacts said diecut sheet during said stripping operation.

* * * * *